United States Patent Office 2,994,190
Patented Aug. 1, 1961

2,994,190
ADDITIVES FOR NITRIC ACID
Joe M. Burton, McGregor, Tex., assignor to Phillips Petroleum Company, a corporation of Delaware
No Drawing. Filed June 7, 1954, Ser. No. 435,059
4 Claims. (Cl. 60—35.4)

This invention relates to a method for treating nitric acid. In one of its aspects, this invention relates to a method for the protection of various materials of construction against corrosion by nitric acid. In another aspect, this invention relates to a method of treating fuming nitric acid for use as an engine fuel oxidant. In still another aspect, this invention relates to a method for reducing ignition delay of a hypergolic fuel when oxidized with fuming nitric acid.

The propelling action of a rocket engine (or motor) is derived from the generation of large quantities of gases by the reaction of a suitable propellant within the engine combustion chamber. The propellants employed in a rocke engine can be a solid or liquid monopropellant, or it can be two liquids comprising a fuel and an oxidizer (bipropellant).

The principal elements of a bipropellant liquid-rocket engine are a combustion chamber, exhaust nozzle, propellant injection system, fuel tank, oxidant tank, and control valves. The fuel and oxidant react in the combustion chamber to form high temperature gases at pressures governed by the nozzle throat area, rate of propellant consumption, ratio of fuel to oxidant, and the efficiency of conversion. Combustion temperature and thus pressure are also functions of the fuel and oxidant used. These high temperature gases are accelerated by a de Laval nozzle to a very high velocity (usually in excess of 4000 ft./sec.). The reaction force resultant to this gas acceleration provides thrust to drive the rocket.

The injection system through which the liquid propellants (fuel and oxidant) flow into the combustion chamber is usually designed to mix the propellants as they enter. The reaction of the fuel and oxidant may be enhanced by atomization accompanied by pressure drop through the nozzle or by inpingement of the fuel and oxidant streams, or it may be desirable to prevent substantial atomization depending on the engine and propellant system used. To start the operation of the rocket motor an electric igniter is necessary with some propellants, but propellants which ignite spontaneously on contact with each other are most frequently employed and are preferred. These propellant fuels which ignite spontaneously on contact with the oxidizer are called hypergolic fuels. It is desirable that the fuel ignite as soon as possible upon contact in order to prevent the build up of excess fuel in the combustion chamber prior to ignition.

It is generally recognized that the starting characteristics of a given rocket motor depends on motor design and ignition delay.

My invention pertains to hypergolic fuels, either alone or in admixture with other fuels, which are spontaneously ignited by fuming nitric acid as the oxidizer.

Nitric acid and particularly concentrated and fuming nitric acids are known to be very corrosive oxidizing acids. Containers and pipes used to convey and store these liquids must necessarily be made of special metals and alloys in order to combat this corrosive attack for a reasonable length of time. These alloys are generally expensive and are, particularly in times of national emergency, in short supply. Aluminum and aluminum alloys, for example, are somewhat resistant to corrosion against the concentrated and fuming nitric acids, wherein the dilute nitric acids readily attack aluminum. Aluminum also has certain deficiencies in mechanical properties. Stainless steels on the other hand, are fairly resistant to dilute nitric acids but are readily attacked by the concentrated and fuming nitric acids. The use of the more plentiful and less expensive steels and iron alloys as construction materials for containers, valves, pipes, rocket engine combustion chamber, and other parts coming in contact with nitric acids, and particularly the highly concentrated nitric acids would be very desirable.

Nitric acid as an oxidizing material for hypergolic fuels has been mentioned. Other uses for nitric acid include nitration of organic compounds, acidizing oil and gas wells to increase the well production, and many other uses. However, in all of these applications, corrosion is a serious problem.

By the practice of my invention a small amount, 0.1 to 10.0 percent by weight zinc based on the acid weight, of metallic zinc or an inorganic, nitric acid-soluble zinc compound is added to the nitric acid. I have found that by such additions, the acid is less corrosive, the freezing point is lowered, fuming nitric acid is stabilized on storing, and the ignition delay is reduced when the fuming acid is used as the oxidizer for hypergolic fuels. Higher percents of zinc can be used but are not necessary.

Zinc, in the form of zinc oxide (ZnO), zinc peroxide ($ZnO_2$), and zinc nitrate, is readily soluble in nitric acid and is also relatively inexpensive and in plentiful supply. The compounds mentioned are the preferred zinc compounds used in the method of this invention. However, any inorganic zinc compound which is soluble in the acid and which will be non-injurious to the acid for the purpose for which the acid is to be used can be utilized. Such materials include zinc metal, zinc arsenate, zinc carbonate, zinc iodate, zinc iodide, zinc phosphate, zinc sulfide, etc., it being within the skill of the art to determine which inorganic zinc compounds are soluble in the acid. However, zinc metal will weaken the acid somewhat, the amount depending on the amount of zinc used.

An object of this invention is to provide a method for reducing the corrosion of materials of construction when contacted by nitric acid.

Another object of this invention is to provide a method for reducing the ignition delay in a rocket engine where a hypergolic fuel is ignited and oxidized with fuming nitric acid.

The fuming nitric acids suitable as an oxidant for hypergolic fuels are so called WFNA (white fuming nitric acid) and RFNA (red fuming nitric acid).

Specifications for nitric acid, obtained commercially as red fuming nitric acid, are as follows:

| Chemical composition: | Percent by weight |
|---|---|
| $HNO_3$ | minimum__ 90.5 |
| Water, | maximum__ 2.5 |
| $NO_2$ | 6.5–7.25 |

Specifications for nitric acid, obtained commercially as white fuming nitric acid, are as follows:

| Chemical composition: | Percent by weight |
|---|---|
| $HNO_3$, | minimum__ 97.5 |
| Water, | maximum__ 2.0 |
| $NO_2$, | maximum__ 0.5 |

There are many hypergolic fuels available. While this list is not intended to be exhaustive, it will illustrate the wide variety of materials which have the property of spontaneous combustion on being contacted with fuming nitric acids. They include liquid organic compounds containing at least one amine radical such as aniline, ortho-toluidine, trimethylamine, and other liquid amines in which amino groups constitute a large percentage of the total molecules; liquid hydrocarbons of the acetylene type and containing a large fraction of unsaturated (double and triple) carbon bonds, or both, for example, divinyl acetylene, dipropargyl, and propargyl alcohol; combustible liquid slurries of the elements having lithium (Li), beryllium (Be), boron (B), aluminum (Al), magnesium (Mg), phosphorus (P), potassium (K), and sodium (Na), liquid hydrides of these solvents, liquid organometallic compounds containing one or more of these elements, liquid fuels containing one or more of these elements in solution, and liquid fuels containing one or more of these elements in suspension; ring compounds containing a heterocyclic nitrogen such as pyrrole terpenes such as pinene and oxygenated derivatives of terpenes such as pinole and terpinol; hydrazine; ozonides, furfuryl alcohol; mercaptans and substituted mercaptans such as mixed butyl mercaptan; organic compounds of phosphorous such as hexamethyltriamidophosphate, etc.

These hypergolic fuels can be used alone or in conjunction with other liquid fuels such as petroleum oils. Usually the hypergolic fuel and the fuel oil will be mixed prior to entering the combustion chamber, however, they can enter by separate streams. In such mixtures, sufficient hypergolic fuel will be used to insure spontaneous ignition.

My invention will be further described by the following examples, however, it should be understood that these examples are for the purpose of illustration only and I am not limited to the particular fuels or materials used.

EXAMPLE I

A series of runs were made by the use of a drop test apparatus to determine the ignition delay at 75° F. and −40° F. on blends of a JP–4 fuel (a hydrocarbon fuel) and N,N,N′,N′-tetramethylpropene-1,3-diamine (a hypergolic fuel) with fuming nitric acids in the presence of zinc compounds.

The drop test apparatus consists of an injection nozzle controlled by a solenoid operated pintle valve which injects the oxidant into a small quantity of fuel contained in the bottom of a test tube. The ignition delay is taken as the time interval between contact of the acid and fuel and the presence of flame as sensed by a photocell.

JP–4 fuel is a hydrocarbon fuel oil meeting the Military Specification MIL–F–5624B and amendment 1 for JP–4 fuel.

The particular JP–4 fuel used in this example had the following properties:

| | | |
|---|---|---|
| API gravity | | 50.9 |
| ASTM distillation, initial boiling point | ° F__ | 126 |
| 5% | ° F__ | 187 |
| 10% | ° F__ | 229 |
| 20% | ° F__ | 274 |
| 30% | ° F__ | 298 |
| 40% | ° F__ | 317 |
| 50% | ° F__ | 333 |
| 60% | ° F__ | 347 |
| 70% | ° F__ | 362 |
| 80% | ° F__ | 382 |
| 90% | ° F__ | 415 |
| 95% | ° F__ | 448 |
| End point | ° F__ | 488 |
| Aniline point | ° C__ | 54.4 |
| Paraffins | percent__ | 53.7 |
| Naphthenes | do____ | 30.6 |
| Olefins | do____ | 3.8 |
| Total aromatics | do____ | 12.9 |
| Aromatics boiling above 400° F | do____ | 2.6 |

Existing gun-steam jet 450° F., 0.1mg./100 ml.
Accelerated gun-air jet 400° F., 0.3 mg./100 ml.
Note: Contains—
  24% gasoline
  66% naptha
  10% kerosene Result of these runs showing ignition delay are given in the following table where the ignition delay is given in milliseconds.

Table 1

| | Vol. Percent JP-4 fuel in the hypergole | | | | | | | | Temp., ° F. |
|---|---|---|---|---|---|---|---|---|---|
| | 0 | 10 | 20 | 30 | 40 | 45 | 50 | 60 | |
| Additive (Percent by weight in RFNA): | | | | | | | | | |
| None | 23 | 32 | 74 | 117 | ¹NI | | | | +75 |
| 3% ZnO₂ | 6.7 | 11 | 12 | 13 | 18 | 33 | 59 | 78 | +75 |
| 1% ZnO₂ | | | 20 | 22 | 37 | | | | +75 |
| 0.5% ZnO₂ | | | 23 | 36 | 40 | | | | +75 |
| 0.2% ZnO₂ | | | 68 | 103 | 160 | | | | +75 |
| 3% ZnO | | | | | 28 | | | | +75 |
| 3% Zn(NO₃)₂ | | | | | 29 | | | | +75 |
| None | 20 | 22 | 90 | ¹NI | | | | | −40 |
| 3% ZnO₂ | 7.5 | 12 | 26 | ²50-90 | | | | | −40 |
| Additives (Percent by weight in WFNA): | | | | | | | | | |
| None | 16 | 28 | 33 | | | | 23 | 52 | +75 |
| 3% ZnO₂ | 5.6 | | | | | | 14 | 38 | +75 |
| 3% ZnO | 5.5 | | | | | | 14 | 26 | +75 |

¹ NI=no ignition.
² Erratic.

From the above table it can be seen that the zinc compounds gave marked improvements in ignition delay reduction. For example, at a fuel mixture containing 60% hypergolic material and 40% JP–4 fuel at 75° F. there was no ignition without the zinc compound while as little as 0.2% ZnO₂ caused the fuel to ignite. It is also seen that very low zinc concentration gives some improvement and one percent ZnO₂ (.67% Zn) gave excellent results. Therefore the preferred range of zinc in my invention is 0.5 to 5.0 percent by weight.

A second series of runs were made wherein 347 stainless steel and 61S—T6 aluminum was stored in fuming nitric acid to determine the corrosion resistance improvement with zinc compounds. The data shows the loss in weight at various periods of storage.

Specification for 347 stainless steel is as follows:

Percent:
  Carbon _____maximum__ 0.8
  Chromium _____ 17–19
  Nickel _____ 9–12
  Cobalt, 10 times carbon precent.

Specification for 61 S aluminum is as follows:

| | Percent |
|---|---|
| Magnesium | 1 |
| Silicon | 0.6 |
| Copper | 0.25 |
| Chromium | 0.25 |

The T6 refers to the degree of temper.

| Acid Plus Additive | Sample | Original Wt. | Loss in Wt. | | | | |
|---|---|---|---|---|---|---|---|
| | | | 2 days | 7 days | 14 days | 21 days | 28 days |
| WFNA Control | 347 s.s. | 1.3492 | .0155 | .0504 | .0583 | .0608 | .0620 |
| 3% ZnO$_2$ | 347 s.s. | 1.3552 | .0029 | .0217 | .0231 | .0235 | .0235 |
| 3% ZnO | 347 s.s. | 1.3031 | .0037 | .0212 | .0222 | .0225 | .0229 |
| 3% Zn(NO$_3$)$_2$ | 347 s.s. | 1.3603 | .0028 | .0171 | .0186 | .0187 | .0194 |
| RFNA Control | 61S—T6 Al | .8481 | .0030 | .0086 | .0140 | .0277 | .0517 |
| 3% ZnO$_2$ | 61S—T6 Al | .8610 | .0019 | .0073 | .0116 | .0171 | .0224 |
| 3% ZnO | 61S—T6 Al | .8452 | .0023 | .0073 | .0109 | .0162 | .0262 |
| 3% Zn(NO$_3$)$_2$ | 61S—T6 Al | .8563 | .0029 | .0078 | .0120 | .0210 | .0341 |

The above data shows that nitric acid containing zinc compounds is less corrosive than are those which are not inhibited.

I have illustrated my invention using a specific hypergolic fuel and a specific hydrocarbon fuel, however, my invention is equally applicable to other hypergolic fuels and hydrocarbon fuels.

In illustrating my invention I have used fuming nitric acid as the acid in the corrosion test. Since the fuming nitric acids are the acids most generally utilized as an oxidant in conjunction with hypergolic fuels, these are the preferred acids in my invention, however, the inorganic soluble zinc compounds are effective as corrosion inhibition in both dilute and concentrated nitric acid.

I have used the oxides of zinc (ZnO and ZnO$_2$) and zinc nitrate in illustrating my invention. These materials are readily soluble, inexpensive, and are generally in good supply and are the preferred zinc compounds of my invention. However, the other acid soluble inorganic zinc compounds as well as metallic zinc can be used in my invention. In general, the zinc compound will react with the acid and the zinc will be present as Zn$^{++}$ ions balanced by NO$_3$ ions.

I claim:
1. The method of operating a rocket engine to reduce corrosion and ignition delay wherein fuming nitric acid is used as an oxidizing material, said method consisting essentially of simultaneously introducing in such proportions to produce spontaneous combustion as a hypergolic fuel an organic amine selected from the group consisting of aniline, orthotoluidine, tri-lower alkyl amines, and N,N,N',N'-tetra lower alkyl lower alkene diamines, said fuel being spontaneously ignited with fuming nitric acid, and fuming nitric acid containing from 0.1 to 10 weight percent zinc therein into the combustion chamber of said rocket engine.
2. The method of operating a rocket engine to reduce corrosion and ignition delay wherein fuming nitric acid is used as an oxidizing material, said method consisting essentially of simultaneously introducing, in proportions to produce spontaneous combustion, up to about 60 weight percent of a liquid petroleum hydrocarbon jet fuel and the balance being an organic amine selected from the group consisting of aniline, orthotoluidine, tri-lower alkyl amines and N,N,N',N'-tetra lower alkyl lower alkene diamines, the mixture being spontaneously ignited with fuming nitric acid, and fuming nitric acid containing from 0.1 to 10 weight percent zinc therein, into the combustion chamber of said rocket engine.
3. The method of operating a rocket engine to reduce corrosion and ignition delay wherein fuming nitric acid is used as an oxidizing material, said method consisting essentially of simultaneously introducing, in proportions to produce spontaneous combustion, N,N,N',N'-tetramethylpropene-1,3-diamine and fuming nitric acid containing from 0.1 to 10 weight percent zinc therein, into the combustion chamber of said rocket engine.
4. The method of claim 3 wherein the zinc is in the range 0.5 to 5 weight percent.

References Cited in the file of this patent

UNITED STATES PATENTS

| | | |
|---|---|---|
| 2,331,270 | George | Oct. 5, 1943 |
| 2,573,471 | Malina et al. | Oct. 30, 1951 |
| 2,623,835 | Van Melsen | Dec. 30, 1952 |
| 2,706,149 | Brenneman | Apr. 12, 1955 |
| 2,771,737 | Scott et al. | Nov. 27, 1956 |

OTHER REFERENCES

JARS, March 1949, page 38. (Copy in Scientific Library.)

Fontana: Industrial & Eng. Chem., vol. 44, #10, October 1952, pp. 101A, 102A, 104A.

Gunn: JARS, No. 22, January-February 1952, pp. 33-38. (Copy in Scientific Library)

Zucrow: Journal of the American Rocket Society, No. 72, December 1947, page 33. (Copy in Scientific Library.)

Uhlig: Corrosion Handbook, John Wiley and Sons, New York, (1948), page 906. (Copy in Scientific Library.)

Mellor: Compresensive Treatise on Inorganic and Theoretical Chemistry, vol. 4, Longmans, Green and Co., New York (1923), page 650. (Copy in Scientific Library.)